April 10, 1945. J. W. DALGLEISH 2,373,550
OVEN FOR HEATING FILAMENTARY PRODUCTS
Filed July 11, 1944 2 Sheets-Sheet 1
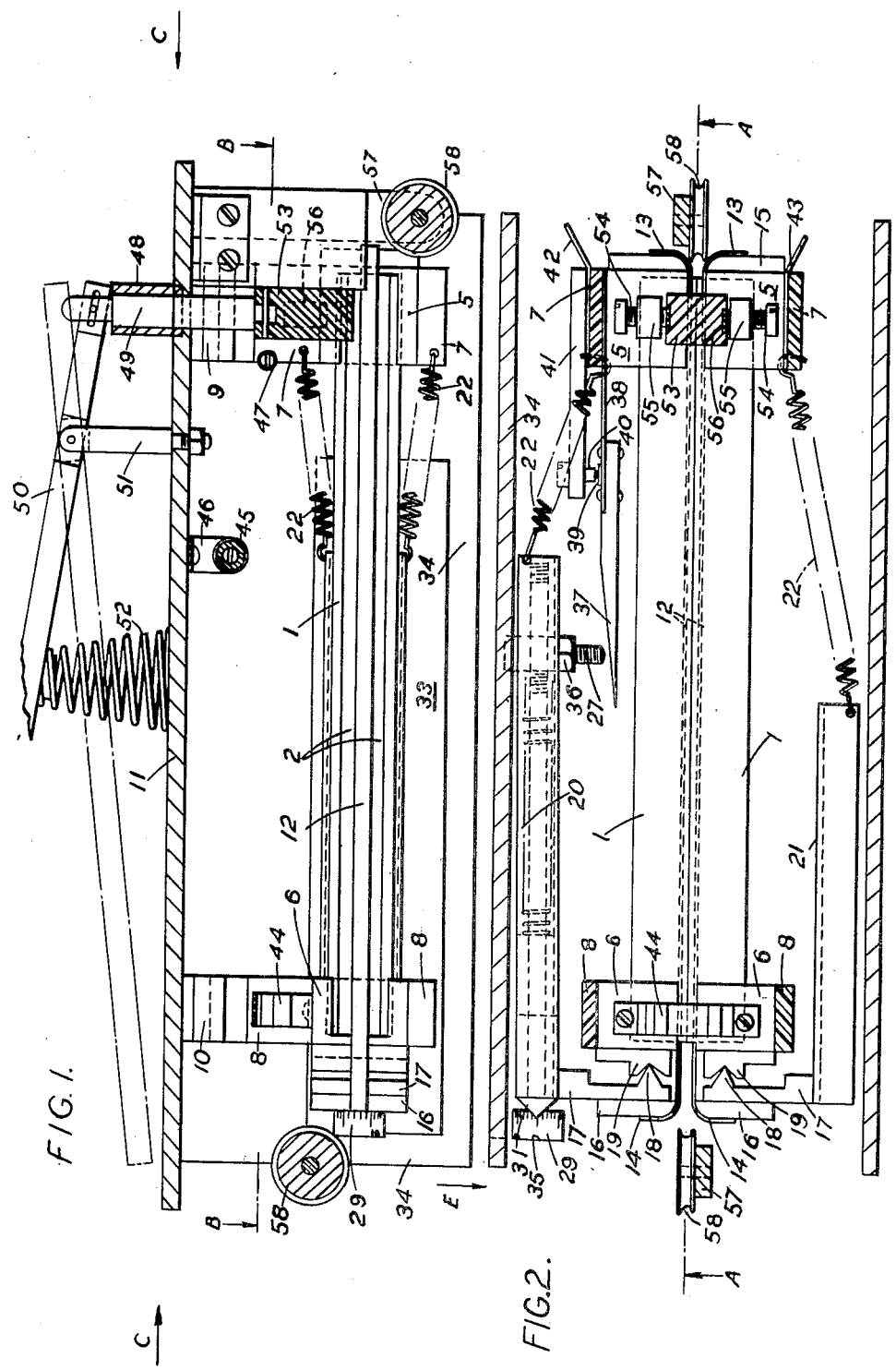
Inventor
J. W. DALGLEISH
By
Emery Holcombe Blair
Attorneys April 10, 1945.  J. W. DALGLEISH  2,373,550
OVEN FOR HEATING FILAMENTARY PRODUCTS
Filed July 11, 1944  2 Sheets-Sheet 2
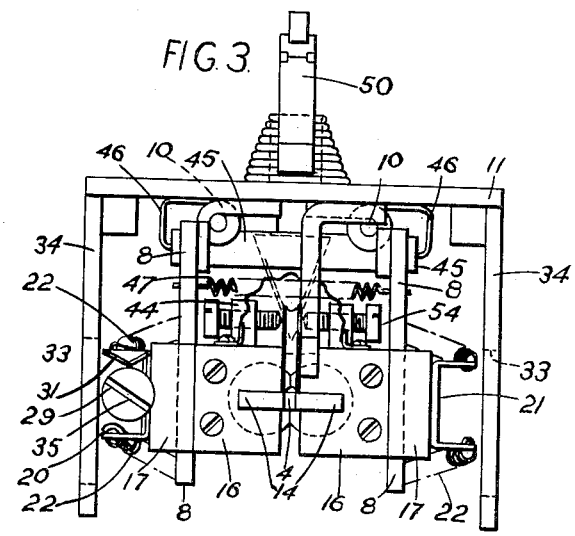
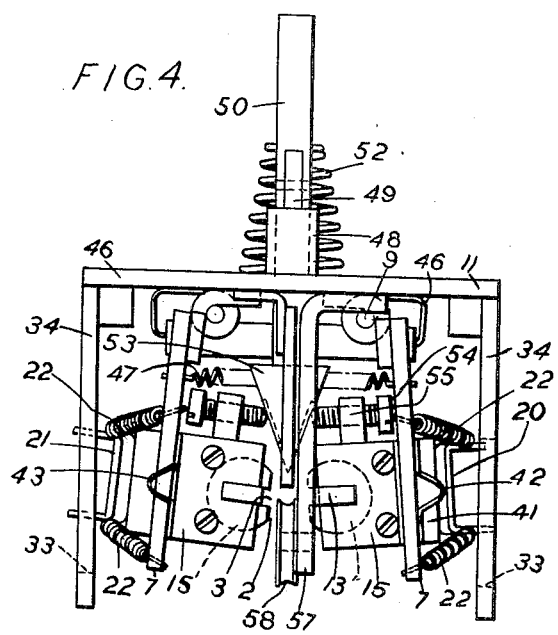
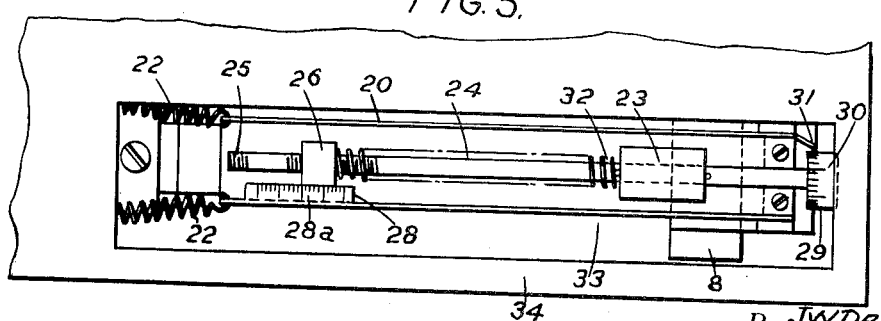
Inventor
By J W Dalgleish
Attorneys Patented Apr. 10, 1945

2,373,550

UNITED STATES PATENT OFFICE 2,373,550

OVEN FOR HEATING FILAMENTARY PRODUCTS

James W. Dalgleish, Cambridge, England, assignor to Pye Limited, Cambridge, England, a British company Application July 11, 1944, Serial No. 544,421
In Great Britain November 25, 1942

16 Claims. (Cl. 219—20)

The present invention relates to electrically heated ovens for the heat treatment of filamentary products and more particularly for the processing of insulated electric conductors or wires, for the purposes of drying, baking, condensing, or otherwiese modifying, the insulating coating.

The oven in accordance with the invention is especially suitable for the processing of the enamel covering on enamel insulated wires, and is particularly convenient for use in a continuous covering process. In the technique of applying enamel as an insulating covering to wire, it is customary to carry the wire through a bath containing the insulating enamel and through a baking oven successively in a number of transits until an adequate film of enamel has been formed over the surface of the wire.

To achieve this the wire has to be passed over pulleys after the first passage through the oven. The necessary length of the oven will therefore depend on the speed of feeding the wire and the length of time which is required to make the enamel to ensure that when it leaves the oven it is sufficiently hard to pass over the pully without damage to the enamel film. Furthermore, the oven length will depend on the temperature at which it is possible to operate the oven; the higher the temperature employed, the shorter the necessary run. The maximum temperature which it is possible to employ is dependent in a major degree on any fluctuations in temperature due to the effects of draughts or imperfect thermostatic control, since the mean temperature of the oven has to be adjusted to such a value that damage to the enamel coating does not occur at the peak temperature of fluctuation.

Fluctuations in temperature can be more readily reduced to a small amount if the total bulk of the oven is kept as small as possible and this is obviously desirable from the further aspect that the power required to maintain the oven temperature will thereby be smaller.

With these considerations in view, an object of the present invention is to provide an improved oven of compact construction and incorporating a simple and reliable thermostatic control, for achieving economic thermal processing of a filamentary product such as enamelled wire. Inter alia, the oven provided by the invention is made long in the direction of travel of the product therethrough in comparison with its internal transverse dimensions, the latter being kept as small as possible having regard to the size and number of filaments which it is required to process. With such an oven, difficulty would be experienced in threading the product through the oven at the commencement of processing, especially when a number of filaments, or the same filament in successive stages of processing, have to pass at the same time through the oven. Another object of the present invention is to avoid this difficulty by constructing the oven so that a filament can easily be placed therein without the necessity for threading it as above mentioned.

Accordingly, the invention consists in the features of construction, combinations of elements and arrangements of parts, and in the several steps and relation and order of each of the same to one or more of the others, all as will be illustratively described herein, and the scope of the application of which will be more particularly pointed out in the appended claims.

In the drawings forming part of this specification,

Fig. 1 is a side section, taken on the line A—A of Fig. 2, of an oven constructed in accordance with the invention, which is especially suitable for heat treating the covering of insulation-coated conductors or wires.

Fig. 2 is a sectional plan taken on the line B—B of Fig. 1.

Fig. 3 is an end view looking in the direction of the arrow C in Fig. 1, and showing the oven closed.

Fig. 4 is an end view looking in the direction of the arrow D in Fig. 1, and showing the oven open.

Fig. 5 is a fragmentary side view looking in the direction of the arrow E in Fig. 2.

Referring to the drawings, the oven illustrated is constructed in two mutually separable halves and comprises a pair of elongated members 1 of a material having a low thermal conductivity (in other words, thermally insulated) and a very low coefficient of thermal expansion. Quartz is an eminently suitable material, and in the preferred form as shown, these members consist of a pair of solid cylindrical quartz rods, each formed with a flat surface 2 extending longitudinally of the rod from end to end and having a rectangular channel 3 formed in the flat surface 2 and likewise extending longitudinally from end to end of the rod. The rods 1 are arranged parallel to each other with their flat surfaces 2 and channels 3 face to face so that when the two rods are brought together with their faces 2 in contact, the two channels 3 thereof register to form a rectangular enclosure 4 (see in Fig. 3) which is open at both ends. Each quartz rod 1 is secured at its ends into metal blocks 5 and 6 so that the face 2 stands out from the blocks (as more clearly seen in Figs. 3 and 4) so as to provide an insulating margin between the blocks of the two rods when the latter are brought together. The end blocks 5 and 6 of each rod 1 are respectively secured to brackets 7 and 8 of insulating material which are in turn attached to hinges 9 and 10 fixed to the top plate 11 of the oven framework. The rods 1 can thus be swung about the hinges to open and close the oven.

Laid along and against the bottom of the channel 3 in each rod 1 is an electric heating element in the form of a conducting strip 12 of suitable metal, e. g. nickel, which occupies the width of the channel and is secured therein by having its ends 13 and 14 extended respectively beyond the open ends of the channel 3 and bent round and conductively secured, as by soldering, to metal, e. g. copper, end plates 15 and 16. The end plates 15 are fixed to the end blocks 5 of the rods 1. The other end plates 16 are fixed to two levers 17 which engage by knife-edge portions 18 thereon in V-groove fulcra 19 provided on the end blocks 6 of the rods 1. Two channel-section bars 20 and 21 are rigidly secured at one end to the outer ends of the levers 17 respectively, so that these bars extend (like crank extensions of the levers) in the direction of the end blocks 5. The other end of the bars 20 and 21 are respectively connected with the two brackets 7 by two pairs of tension springs 22, as shown, which thus exert a pull on the outer ends of the levers 17 and thereby maintain the heater strips 12 under tension.

Mounted in a bearing block 23 (see Fig. 5) fixed in the channel bar 20 is a micrometer screw 24 which passes through the block 23 so as to be rotatable but not axially displaceable therein, the threaded end 25 of the screw 24 having a nut or follower 26 thereon which carries a threaded stud 27 (see Fig. 2) projecting through an elongated slot (not seen in the drawings) in the bar 20. Associated with the follower 26 is a scale 28a applied, conveniently, to a tongue 28 bent up from the bar 20, and the head 29 of the screw 24 is provided with a vernier scale 30 associated with an index 31 formed on the adjacent end of the bar 20. An anti-backlash compression spring 32 around the screw 24 and abutting against the block 23 presses against the follower 26. An opening 33 in the adjacent side plate 34 of the oven framework allows the scale 28a to be viewed, as well as providing clearance for the bar 20 upon separation of the oven halves as will be later described. A similar opening in the opposite side plate 34 likewise provides working clearance for the bar 21. Returning to the micrometer screw 24, its head 29 is provided with a slot 35 by which the screw may be turned with a screw-driver. By suitably adjusting the micrometer screw 24, the stud 27 may be adjusted along the bar 20 to any position within the limits provided. The stud 27 may be locked in any adjusted position by tightening down a lock nut 36 thereon against the bar 20, as shown in Fig. 2.

Fig. 2 also shows that the stud 27 cooperates with the inclined face of a ramp 37 secured to one end of a spring blade 38 which carries an electric contact 39 and is supported by its other end being clamped between the adjacent bracket 7 and end block 5, the blade being in conductive contact with the latter. By reason of its mounting, the contact 39 is movable and is normally held by the blade 38 in engagement with a fixed contact 40 carried by a bracket 41. The latter and a terminal tag 42 therefor, are fixed to the other side of the same bracket 7 so as to be insulated by the latter from that end block 5. The other end block 5 is provided with a terminal tag 43 clamped between the block and its bracket 7. The end blocks 6 are electrically connected together by a flexible conductor 44 of sufficient length to allow for the separation of the oven halves.

Electric current for heating the oven is supplied to the terminals 42 and 43. From terminal 43 the circuit runs by way of the adjacent block 5 and plate 7 to strip end 13, along strip 12 to strip end 14, plate 16 and lever 17, through the lever fulcrum 18, 19 to block 6, across bridging connector 44 to the other block 6, from there through the other lever 17 and plate 16 to the end 14 of the other strip 12, back along that strip to its plate 15, thence to block 5 and through contacts 39 and 40 and bracket 41 to terminal 42. By arranging a series connection of the heater strips 12 in this manner, the necessity for a long external return conductor of large cross-section is obviated. A resistance 45 supported by brackets 46 from the top plate 11 is included in the circuit by flexible conductors (not shown) which electrically connect it in parallel with the contacts 39 and 40 so that when these contacts are open, the heating circuit is maintained through the resistance 45.

The two hinged brackets 7 are connected together by a tension spring 47 acting to draw the oven halves together and so close the oven. For separating the oven halves, the top plate 11 is provided with an aperture and a bearing sleeve 48 thereover, in which a rod 49 is slidably arranged, the upper end of which is suitably articulated, as by a pin and slot connection, to an operating lever 50 pivoted on a forked bracket 51 mounted on the top plate 11, the lever 50 being loaded by a suitable spring 52. The lower end of the rod 49 carries a wedge 53 which is adapted to engage with its inclined surfaces between adjustable abutments constituted by the facing ends of a pair of screws 54 threaded through lugs 55 on the blocks 5. Suitable precaution is taken to avoid short-circuiting by the engagement of the wedge 53 with the screws 54, for which purpose the wedge may be made of insulating material, and in this case, if necessary, isolated metal inserts such as brass strips 56 may be incorporated with the wedge to act as rubbing surfaces engaging the screws, so as to reduce wear on the wedge. Fig. 3 shows the oven closed, with its two halves held together by spring 47, and the wedge 53 retracted out of engagement with the screws 54. Fig. 4 shows the positions the various parts assume when the wedge has been advanced to cause the oven halves to be separated to the fully open position.

Supported from the top plate 11 by brackets 57 are provided suitable pulleys 58 over which wire to be processed may be passed longitudinally through the oven.

The mode of operation is as follows. The micrometer screw 24 is adjusted so that contacts 39 and 40 are closed when the oven is cold, that is, when no heating current is being supplied to it. Lever 50 is operated to open the oven and a wire to be processed is introduced into the oven through the longitudinal opening between the separated oven halves, and is threaded over the pulleys 58. The oven is then closed by means of lever 50. Upon connecting the terminals 42 and 43 to a source of suitable heating current, the full heating current supplied is fed to the heater strips 12 and the oven becomes rapidly heated. As the strips 12 become hotter they expand longitudinally and since their ends 13 are immovable relatively to the blocks 5, the strips expand towards their ends 14. The linear thermal expansion of the strips is taken up by the levers 17 and springs 22, the latter pulling the levers round so that the bars 20 and 21 approach the rods 1 with increase in oven temperature. The position of the stud 27 carried by bar 20 is so adjusted by the micrometer screw 24 that when the desired oven temperature is reached at which thermostatic control is to be exercised, the corresponding expansion of the strip 12 with which bar 20 is associated will have caused the stud 27 to engage the ramp 37 and move the contact 39 away from the contact 40 at the critical temperature. When the contacts 39 and 40 open, the heating current supply will flow through the resistance 45, thus reducing the current fed to the strips 12 which therefore will gradually cool, their contraction under cooling pulling back the levers 17 against the springs 22 so as eventually to withdraw the stud 27 from engagement with the ramp 37 and thereby restore the circuit through the contacts 39 and 40, resulting in the full heating current being reapplied to the strips 12. By means of this arrangement, the oven temperature may be maintained within very close limits, the temperature of thermostatic control being adjustable by the setting of the micrometer screw 24. It will be observed that the operation of the thermostat contacts 39 and 40 is controlled by the expansion of only one of the heater strips 12. This is found to be sufficient since the temperature of both heater strips, under working conditions, will be substantially the same.

In view of the necessity for extreme freedom from dust in the neighbourhood of the oven, provision may be made for the total enclosure of the system to exclude dust as soon as the equipment is set in operation, and tell-tale or automatic stop-down devices may be included to give indication of wire breakage. Provision may also be made for the circulation of conditioned air through the oven and for the recovery, by condensation, of the solvent removed from the varnish in the baking process. The quartz rods provide thermal insulation for the oven but if this should be insufficient in itself, they may be surrounded by lagging.

Although a preferred embodiment of the invention has been shown in the drawings and described in this specification, it should be understood that the details and features thereof are not intended to be exhaustive of the invention, but are given illustratively with a view to explaining the principles of the invention and the manner of constructing and using the same so that others skilled in the art may be enabled to utilise the invention in various embodiments and with various modifications as may appear to them to be best suited to the conditions of a particular use. I am aware, for instance, that in place of the plain flat heater strips as described there may be employed channelled strip heaters fitting the channels of the quartz rods, and that instead of hinging the oven halves they may be mounted so as to be separable otherwise such as by being slidable or displaceable rectilinearly. Accordingly, the invention is not to be regarded as limited othewise than by the scope of the appended claims.

I claim:

1. A thermostatically-controlled electrically heated oven for heat treatment of a filamentary product such as enamelled wire, comprising a tubular heating enclosure which is long compared with its internal cross-section and which is open at each end for passage of a filament longitudinally therethrough, the oven being divided longitudinally into a plurality of mutually separate wall sections which, when brought together, form the heating enclosure and which, when separated, provide a longitudinal opening running the full length of the enclosure through which a filament to be heated may be introduced between the separated sections so as to lie within the enclosure when the sections are brought together to close said opening, at least one of said sections carrying an electric heating element on the inside thereof so that said element extends along the enclosure wall, said element being capable of longitudinal expansion under heat, the oven further comprising means for passing an electric current along said heating element to heat and thereby expand it, and means responsive to the longitudinal thermal expansion of said heating element for controlling the supply of heating current thereto and thereby thermostatically controlling the oven temperature.

2. A thermostatically-controlled electrically heated oven for heat treatment of a filamentary product such as enamelled wire, comprising a tubular heating enclosure which is long compared with its internal cross-section and which is open at each end for passage of a filament longitudinally therethrough, the oven being divided longitudinally into a plurality of mutually separable wall sections which, when brought together, form the heating enclosure and which, when separated, provide a longitudinal opening running the full length of the enclosure through which a filament to be heated may be introduced between the separated sections so as to lie within the enclosure when the sections are brought together to close said opening, each of said wall sections carrying an electric heating element on the inside thereof so that each element extends along the enclosure wall, at least one of said elements being capable of longitudinal expansion under heat, the oven further comprising means for passing an electric current along said elements to heat them, and means responsive to the longitudinal thermal expansion of said expansible element for controlling the supply of heating current to said elements and thereby thermostatically controlling the oven temperature.

3. A thermostatically-controlled electrically heated oven suitable for heat treatment of a filamentary product such as enamelled wire, comprising a plurality of wall members forming a tubular heating enclosure which is long compared with its cross-section and which is open at each end for permitting a filament to be passed longitudinally therethrough, electric heating means extending along the inside of said members from end to end thereof and including an electric heating element capable of longitudinal expansion under heat, means for supplying an electric heating current to said heating means to heat the same and thereby cause said element to expand, means responsive to thermal expansion of said heating element for controlling said current supply means in accordance with such expansion, said members being mutually separable to form a longitudinal opening to said enclosure running the full length thereof through which a filament to be treated may be introduced laterally between said separated members so as to lie longitudinally within the enclosure formed when said members are brought together to close said opening, and means for separating and bringing together said members.

4. A thermostatically-controlled electrically heated oven adapted for heat treatment of a filamentary product such as enamelled wire, comprising a plurality of heat insulating wall members forming a tubular heating enclosure which is long compared with its cross-section and which is open at each end for permitting passage of a filament longitudinally therethrough, electric heating means on the inside of said members and including an electric heating element capable of longitudinal thermal expansion extending along one of said walls, said wall adjacent said element having a low coefficient of thermal expansion relatively to that of said element, means for supplying an electric heating current to said heating means to heat the same and thereby cause said element thereof to expand longitudinally, means responsive to the differential thermal expansion of said element and said wall adjacent thereto for controlling said current supply means in accordance with such differential expansion, said members being mutually separable to form a longitudinal opening to said enclosure running the full length thereof through which a filament to be treated may be introduced laterally between said members so as to lie within the enclosure formed when said members are brought together to close said opening, and means for separating and bringing together said members.

5. A thermostatically-controlled electrically heated oven adapted for heat treatment of a filamentary product such as enamelled wire, comprising a plurality of mutually separable wall members of heat insulating material having a low coefficient of thermal expansion and adapted, when brought together, to form a tubular heating enclosure which is long compared with its cross-section and which is open at both ends to permit passage of a filament longitudinally therethrough, said members being adapted, when separated, to form a longitudinal opening to said enclosure running the full length thereof through which a filament to be treated may be introduced laterally between said separated members so as to lie within said enclosure formed when said members are brought together to close said opening, a plurality of electric heating elements carried one on the inside of each of said members so as to extend along the enclosure wall, at least one of said elements being capable of longitudinal expansion under heat, means for supplying an electric heating current to all said elements to heat them, and means responsive to the differential longitudinal thermal expansion of said expansible element and the wall member carrying it, for controlling said current supply means in accordance with such differential expansion.

6. An oven as defined in claim 5, in which said expansion-responsive means includes a movable mechanical device such as a lever adapted to be moved by the differential expansive movement of said expansible element and wall member, and in which said current supply means includes switching means coupled with said movable device so as to be actuated by such movement thereof.

7. A thermostatically-controlled electrically heated oven suitable for heat treating a filamentary product such as enamelled wire, comprising a plurality of heat insulating wall members forming a tubular heating enclosure open at both ends, said members being mutually separable to form an opening in the side of and running the full length of said enclosure to permit a filament to be introduced sideways through such opening into said enclosure, said opening being closed upon bringing said members together, electric heating means capable of thermal expansion carried on the inside of at least one of said members, means for supplying electric heating current to said heating means to heat the same, and means responsive to expansion of said heating means for controlling said current supply means in dependence upon such expansion, whereby said heating means controls its own heat supply thermostatically.

8. A thermostatically-controlled electrically heated oven suitable for heat treating a filamentary product such as enamelled wire, comprising a plurality of heat insulating wall members forming a tubular heating enclosure open at both ends, said members being mutually separable to form an opening in the side of and running the full length of said enclosure to permit a filament to be introduced sideways through such opening into said enclosure, said opening being closed upon bringing said members together, at least one of said members carrying a strip conductor forming an electric heating element extending along the inside of said member, said strip being capable of longitudinal expansion under heat, means including a switch for supplying electric heating current to said strip to heat and thereby expand the same, means for tensioning said strip and adapted to move, upon such expansion of said strip, so as to maintain the tension thereon, said tensioning means being coupled with said switch so as to control the same for thereby controlling the supply of heating current to said strip in dependence upon the temperature thereof.

9. A thermostatically-controlled electrically heated oven suitable for heat treating a filamentary product such as enamelled wire, comprising a plurality of heat insulating wall members forming a tubular heating enclosure open at both ends, said members being mutually separable to form an opening in the side of and running the full length of said enclosure to permit a filament to be introduced sideways through such opening into said enclosure, said opening being closed upon bringing said members together, a plurality of thermally expansible strip conductors forming electric heating elements carried individually by said members along the inside thereof, means on each member for tensioning the strip thereof and adapted to move, upon expansion of the strip, so as to maintain the tension thereon, means including a switch for supplying electric heating current to all said strips to heat and thereby expand the same, and means controlled by said movement of at least one of said tensioning means for actuating said switch to thereby control the supply of heating current to said strips in dependence upon their temperature.

10. An oven as defined in claim 7, in which said heating current supply means includes a high current path and a low current path to said heating means, and switch means for selectively connecting said heating means in said path, said heating means being connected in said high current path when cold, said expansion-responsive means being adapted, responsive to expansion of said heating means, to cause said switch to connect said heating means in said low current path pending contraction of said heating means under cooling.

11. An oven as defined in claim 8, in which said heating current supply means further includes a high current path and a low current path to said strip, said switch connecting said strip in said high current path when cold, said tensioning means when moved in response to expansion of said strip being adapted to cause said switch to cut out said high current path and connect said low current path to said strip pending contraction of said strip on cooling.

12. A thermostatically-controlled electrically heated oven adapted for heat treatment of a filamentary product such as enamelled wire, comprising a plurality of mutually separable wall members of heat insulating material having a low coefficient of thermal expansion and adapted, when brought together, to form a tubular heating enclosure which is long compared with its cross-section and which is open at both ends to permit passage of a filament longitudinally therethrough, said members being adapted, when separated, to form a longitudinal opening to said enclosure running the full length thereof through which a filament may be introduced laterally between said separated members so as to lie within said enclosure formed when said members are brought together to close said opening, electric heating means carried on the inside of said members and including a thermally expansible heater strip extending from end to end of one of said members, means fixing said strip and said member together at one and the same end thereof, whereby said strip is capable of longitudinal thermal expansion only in the direction of its other end, means attached to said other end of said strip and mounted on the adjacent end of said member for tensioning said strip, said tensioning means being adapted to move in accordance with the differential expansive movement of said other end of said strip relatively to the adjacent end of said member so as thereby to maintain the tension on said strip, means for supplying electric heating current to said heating means to heat the same and thereby cause said strip thereof to expand, and switch means actuated by the resultant movement of said tensioning means to control the supply of heating current by said supply means to thereby thermostatically control the oven temperature.

13. A thermostatically-controlled electrically heated oven adapted for heat treatment of a filamentary product such as enamelled wire, comprising a pair of elongated open-ended channeled members of a material such as quartz which is thermally insulating and has a low coefficient of thermal expansion, the channels of which together form a tubular heating enclosure which is open at each end for passage of a filament longitudinally therethrough and which is long compared with its internal cross-section, means mounting said members so as to be mutually separable to provide a longitudinal opening running the full length of said enclosure through which a filament to be heated may be introduced between the members so as to lie within the enclosure when the members are brought together to close said opening, an elongated electric heating element in the channel of each member, said element consisting of a metal strip snugly fitting at least part of the channel wall and extending from end to end of said member, said strip being fixed at one end thereof to the adjacent end of said member and the other end of said strip being capable of expansion longitudinally relatively to the adjacent end of said member, means including a switch for applying electric heating current to said strips to heat the same, and lever means coupled with said switch and associated with the free end of one of said strips so as to be caused to move by movement of said free end under longitudinal thermal expansion of the strip, and thereby actuate said switch to control the supply of heating current to said strips.

14. A thermostatically-controlled electrically heated oven adapted for heat treatment of a filamentary product such as enamelled wire, comprising a pair of parallel elongated members of heat insulating material, means mounting said members so as to be capable of being brought together and moved apart, said members having surfaces thereof adapted to contact each other along their entire length when said members are brought together and having a pair of open-ended channels respectively in their said surfaces, said channels facing each other so as to form a tubular enclosure, when said members are in contact, which runs the length of said members and is open at its ends, means urging said members into contact, means for separating said members against the action of said urging means, at least one of said members carrying a thermally expansible electric heating element extending along the channel thereof from one end of the channel to the other, means for passing electric heating current along said element to heat and thereby expand it, and means carried on said member and associated with said element therein for actuation in response to expansion of said element to thereby control the supply of heating current to said element.

15. An oven as defined in claim 14, in which said heating element comprises a heater strip and said expansion-responsive means comprises a strip tensioning device adapted to move upon expansion of said strip to thereby maintain the tension on said strip, said current supply means including a switch coupled with said tensioning device whereby to be actuated responsively to the movement of said tensioning device for controlling the current supply to said strip.

16. An oven as defined in claim 7, and further comprising pulleys on fixed carriers adjacent both ends of the separable members, whereby a filament passed over the pulleys when said members are separated will lie in and extend through the enclosure formed when said members are brought together.

JAMES WHITE DALGLEISH.